United States Patent [19]
Patil et al.

[11] Patent Number: 5,633,326
[45] Date of Patent: May 27, 1997

[54] POLYOLEFIN-SUBSTITUTED AMINES GRAFTED WITH POLY(AROMATIC-N-MONOMERS) FOR OLEAGINOUS COMPOSITIONS

[75] Inventors: Abhimanyu O. Patil, Westfield; Robert D. Lundberg, Bridgewater; Antonio Gutierrez, Mercerville, all of N.J.

[73] Assignee: Exxon Chemical Patents Inc.

[21] Appl. No.: 668,313

[22] Filed: Jun. 26, 1996

Related U.S. Application Data

[63] Continuation of Ser. No. 997,631, Dec. 28, 1992, abandoned, which is a continuation of Ser. No. 450,036, Dec. 13, 1989, abandoned.

[51] Int. Cl.$^6$ ................................................. C08F 8/32
[52] U.S. Cl. .................... 525/327.6; 525/324.6; 525/324.9; 525/330.5; 525/379; 525/382
[58] Field of Search .................. 525/327.6, 329.6, 525/329.9, 330.5

[56] References Cited

U.S. PATENT DOCUMENTS

| | | | |
|---|---|---|---|
| 3,219,666 | 11/1965 | Norman et al. | 260/268 |
| 4,604,427 | 8/1986 | Roberts et al. | 525/185 |

FOREIGN PATENT DOCUMENTS

| | | |
|---|---|---|
| 0806736 | 2/1969 | Canada . |
| 0314311 | 5/1989 | European Pat. Off. . |
| 0314845 | 5/1989 | European Pat. Off. . |

OTHER PUBLICATIONS

T. Kobayashi et al., "Polyaniline Film-Coated Electrodes as Electrochromic Display Devices," *J. Electroanal. Chem.* 161, 419–423 (1984).
A. G. MacDiarmid et al., "Polyaniline': Interconversion of Metallic and Insulating Forms", *Mol. Cryst. Liq. Cryst.,* 121, 173–180 (1985).
Y. Cao et al., "Spectroscopic and Electrical Characterization of Some Aniline Oligomers and Polyaniline," *Syn. Met.* 16, 305–315 (1986).
W. Huang et al., "Polyaniline, A Novel Conducting Polymer," *J. Chem. Soc.,* Faraday Trans. 1, 82, 2385–2400 (1986).
F. L. Lu et al., "Phenyl–Capped Octaaniline (COA): An Excellent Model for Polyaniline," *JACS* 108, 8311–8313 (1986).
S. Li et al., *Synth. Met.* 20(2), 141–9 (1987).
F. Wudl et al., "Poly(p–phenyleneamine): Synthesis and Comparison to Polyaniline," *JACS* 109, 3677–3684 (1987).

M. Angelopoulos et al., "Polyaniline: Solutions, Films and Oxidation State," *Mol. Cryst. Liq. Cryst.* 160, 151–163 (1988).
A. Andreatta et al., "Electrically–Conducted Fibers of Polyaniline Spun From Solutions in Concentrated Sulfuric Acid," *Syn. Met.* 26, 383–389 (1988).
S. Li, "Synthesis and Characterization of Soluble Polyaniline," *Syn. Met.* 29 (E329–E336) (1989).
S. P. Armes et al., "The Synthesis of Polymeric Surfactants for the Preparation of Sterically–Stabilized Polyanile Colloids," *Polym. Mater. Sci. Eng.* 60, 751–753 (1989).
A. G. MacDiarmid et al., "The Polyanilines: Processing, Molecular Weight, Oxidation State and Derivatives," *Polymer Pre-prints* 30, 147–48 (1989).
A. Ray et al., "Polyaniline: Doping, Structure and Derivatives," *Synth. Met.* 29, 141–150 (1989).
S. P. Armes et al., "Novel Colloidal Dispersions of Polyaniline" *J. Chem. Soc.,* Chem. Commun. 88–89 (1989).
Y. Wei et al., "Synthesis and Electrochemistry of Alkyl Ring–Substituted Polyanilines," *J. Phys. Chem.* 93, 495–499 (1989).
S. K. Manohar et al., "N–Substituted Derivatives of Polyaniline," *Syn. Met.* 29, 349–56 (1989).

*Primary Examiner*—Bernard Lipman
*Attorney, Agent, or Firm*—Harvey L. Cohen

[57] ABSTRACT

Novel polymers comprising polyolefin-substituted amines grafted with aromatic N-containing monomers such as aniline, have been found to provide oil soluble polymers having dispersant and antioxidant properties in oleaginous compositions, including fuel and lubricating oils. The polymers of this invention are further useful in electrical applications. These materials are formed by a process which comprises: (a) contacting an amine compound having at least two reactive nitrogen moieties with at least one long chain hydrocarbon-substituted reactant in an amount and under conditions sufficient to form a N-containing polymer adduct containing reactive amine groups, and (b) contacting the N-containing polymer adduct with at least one aromatic N-containing monomer under polymerization conditions to graft said N-containing polymer adduct with aromatic N-containing polymer segments. The long chain hydrocarbon-substituted reactant can comprise materials such as (i) long chain hydrocarbons substituted with mono- or dicarboxylic acid, anhydride or ester groups; (ii) halogenated long chain hydrocarbons; (iii) mixtures of formaldehyde and a long chain hydrocarbyl substituted phenol; and (iv) mixtures of formaldehyde and a reaction product formed by reaction of long chain hydrocarbons substituted with mono- or dicarboxylic acid, anhydride or ester groups and an amino-substituted, optionally hydrocarbyl-substituted phenol.

10 Claims, 1 Drawing Sheet

POLYOLEFIN-SUBSTITUTED AMINES GRAFTED WITH POLY(AROMATIC-N-MONOMERS) FOR OLEAGINOUS COMPOSITIONS

This is a continuation of application Ser. No. 997,631, filed Dec. 28, 1992, abandoned, which is a Rule 62 continuation of Ser. No. 450,036 filed Dec. 13, 1989, abandoned.

FIELD OF THE INVENTION

The present invention relates to a process for forming an oil-soluble polyaniline-grafted polyolefin polymers useful as dispersant and antioxidant additives for oleaginous compositions and also useful as electrically conducting polymers in electrical applications.

BACKGROUND OF THE INVENTION

Polyaniline is one of the oldest polymers known, and has been prepared in the form of emeraldine hydrochloride by oxidizing an aqueous hydrochloric acid solution of aniline with ammonium peroxy disulfate at ambient temperature. Polyaniline is a cheap, highly electrically conducted polymer, but is processable with difficulty in its powder form. Conventionally, making such conjugated conducting polymers oil-soluble and processible has been a very difficult problem.

S. Li et al., *Synth. Met.* 20 (2), 141–9 (1987) discloses the graft polymerization of polyaniline with polyaminostyrene to form polyaniline soluble in common organic solvents (DMF and DMSO, and slightly soluble in methanol and trichloromethane). This procedure involved the nitration of polystyrene (of 120,000 molecular weight) with either fuming nitric acid or a chloroform solution of 100% nitric acid and acetic anhydride. The resulting polynitrostyrene was hydrogenated with phenylhydrazine under nitrogen to form the polyaminostyrene.

S. Li, "Synthesis and Characterization of Soluble Polyaniline," *Syn. Met.* 29 (E329–E336) (1989) reports three general synthetic routes for the solubilization of polyaniline in DMF and DMSO. The experimental synthesis employed either formation of block polyaniline (employing either Para-aminobenzenesulfonylchloride/poly(ethylene glycol) reaction products or para-aminobenzoyl chloride/poly (ethylene glycol) reaction products, and the preparation of graft polyanilines by polymerization of aniline on polyaminostyrene, polyacrylamides or polyepichlorohydrin.

S. P. Armes et al., "The Synthesis of Polymeric Surfactants for the Preparation of Sterically-Stabilized Polyaniline Colloids," *Polym. Mater. Sci. Eng.*, 60, 751–753 (1989) discloses copolymerization of 2- or 4-vinyl pyridine with para-aminostyrene.

T. Kobayashi et al., "Polyaniline Film-Coated Electrodes as Electrochromic Display Devices," *J. Electroanal. Chem.* 161, 419–423 (1984) discloses evaluations of the electrochromic properties of polyaniline films.

A. G. MacDiarmid et al., "'Polyaniline': Interconversion of Metallic and Insulating Forms," *Mol. Cryst. Lig. Cryst.*, 121, 173–180 (1985) describes the synthesis of polyaniline powder and the conversion of this material to various insulating and metallic forms by acid/base and oxidation/reduction mechanisms.

Y. Cao et al., "Spectroscopic and Electrical Characterization of Some Aniline Oligomers and Polyaniline," *Syn. Met.* 16, 305–315 (1986) describes the preparation of aniline oligomers and polyaniline, and proton-doped derivatives.

W. Huang et al., "Polyaniline, a Novel Conducting Polymer," *J. Chem. Soc., Faraday Trans. 1*, 82, 2385–2400 (1986) discloses the chemical synthesis of polyaniline and electrochemical synthesis of polyaniline from aniline.

F. L. Lu et al., "Phenyl-Capped Octaaniline (COA): An Excellent Model for Polyaniline," *JACS* 108, 8311–8313 (1986) discloses the preparation of a mono-dispersed polyaniline of molecular weight of 806 and its conversion to a partially oxidized form.

F. Wudl et al., "Poly(p-phenyleneamine): Synthesis and Comparison to Polyaniline," *JACS* 109, 3677–3684 (1987) discloses the preparation of small polyaniline oligomers by a double condensation of para-phenyl amino-substituted anilines with diethyl succinoyl succinate and the preparation of poly(p-phenaline amine) by the reaction of succino succinic acid (2,5-dioxo-1,4-cyclohexane dicarboxylic acid) and p-phenyline diamine.

A. G. MacDiarmid et al., "The Polyanilines: Processing, Molecular Weight, Oxidation State and Derivatives," *Polymer Pre-prints* 30, 147–48 (1989); M. Angelopoulos et al. "Polyaniline: Solutions, Films and Oxidation State," *Mol. Cryst. Lig. Cryst.* 160, 151–163 (1988); A. Andreatta et al., "Electrically-Conducted Fibers of Polyaniline Spun From Solutions in Concentrated Sulfuric Acid," *Syn. Met.* 26, 383–389 (1988); A. Ray et al., "Polyaniline: Doping, Structure and Derivatives," *Synth. Met.* 29, 141–150 (1989); S. P. Armes et al., "Novel Colloidal Dispersions of Polyaniline," *J. Chem. Soc., Chem. Commun.* 88–89 (1989) also relate to preparation of polyaniline.

Y. Wei et al., "Synthesis and Electrochemistry of Alkyl Ring-Substituted Polyanilines," *J. Phys. Chem.*, 93, 495–499 (1989) discloses the synthesis of poly(o-toluidine), poly(m-toluidine) and poly(o-ethylaniline), by chemical and electrochemical syntheses.

S. K. Manohar et al., "N-Substituted Derivatives of Polyaniline," *Syn. Met.* 29, 349–56 (1989) discloses the preparation of N-methylated polyaniline.

U.S. Pat. No. 4,604,427 relates to forming electrically conducting polymer blends by impregnating a pre-formed host polymer with a cyclic monomer such as aniline and then exposing the mixture with a chemical oxidant to form the conductive polymer reaction product within the surface layer of the host polymer.

Canadian Patent 806,736 relates to an antioxidant for hydrocarbon-type rubber which is in the form of an aromatic polymer having repeating units which consist of an NH-group attached to a difunctional aromatic group prepared by reacting either hydroquinone or para-benzoquinone with various aromatic diamines, such as para-phenylene diamine and 2,7-diamino naphthylene (page 4). The antioxidant activity of exemplary polymers were demonstrated in ethylene-propylene copolymer rubber vulcanisate (pages 7–8).

European Patent Publication 314,311 relates to the preparation of conducting articles by (a) forming a gel of a carrier polymer in a compatible solvent, (b) polymerizing, within the gel, a selected monomer, and (c) doping the article so provided. Disclosed carrier polymers include high molecular weight (M.W.>100,000) flexible chain polymers, such as polyethylene, isostatic polypropylene, poly(ethylene oxide) and polystyrene, and lower molecular weight polymers (10,000–100,000) having "rigid-rod" molecules, such as aramid polymers, aromatic polyesters, PBT and PBI. The polymerization step (b) can include oxidative-coupling polymerization employing aniline. The polymeriztion step results in the formation, within the carrier polymer, of a normally intractable polymeric material derived from the selected monomer.

European Patent Publication 314,845 discloses graft copolymers characterized by oil-soluble substantially linear, carbon-carbon backbone polymer having graft polymerized thereon units derived from $RNH_2$ monomer, wherein R is a hydrocarbon containing a polymerizable ethylenically unsaturated double bond. Illustrated amine monomers include p-aminostyrene and p-(aminomethyl) styrene.

U.S. Pat. No. 3,219,666 discloses lubricating oil dispersants comprising oil-soluble, acylated nitrogen compositions, having within its structure (A) a substantially hydrocarbon-substituted polar group wherein the substantially hydrocarbon substituent contains at least about 50 carbon atoms, and (B) a nitrogen-containing group characterized by a nitrogen atom attached directly to the polar group and which are prepared, e.g., by reacting a polyalkenyl-substituted succinic anhydride with an amine. Aniline and N-cyclohexyl-aniline are disclosed as amine reactants.

SUMMARY OF THE INVENTION

Figure 1:
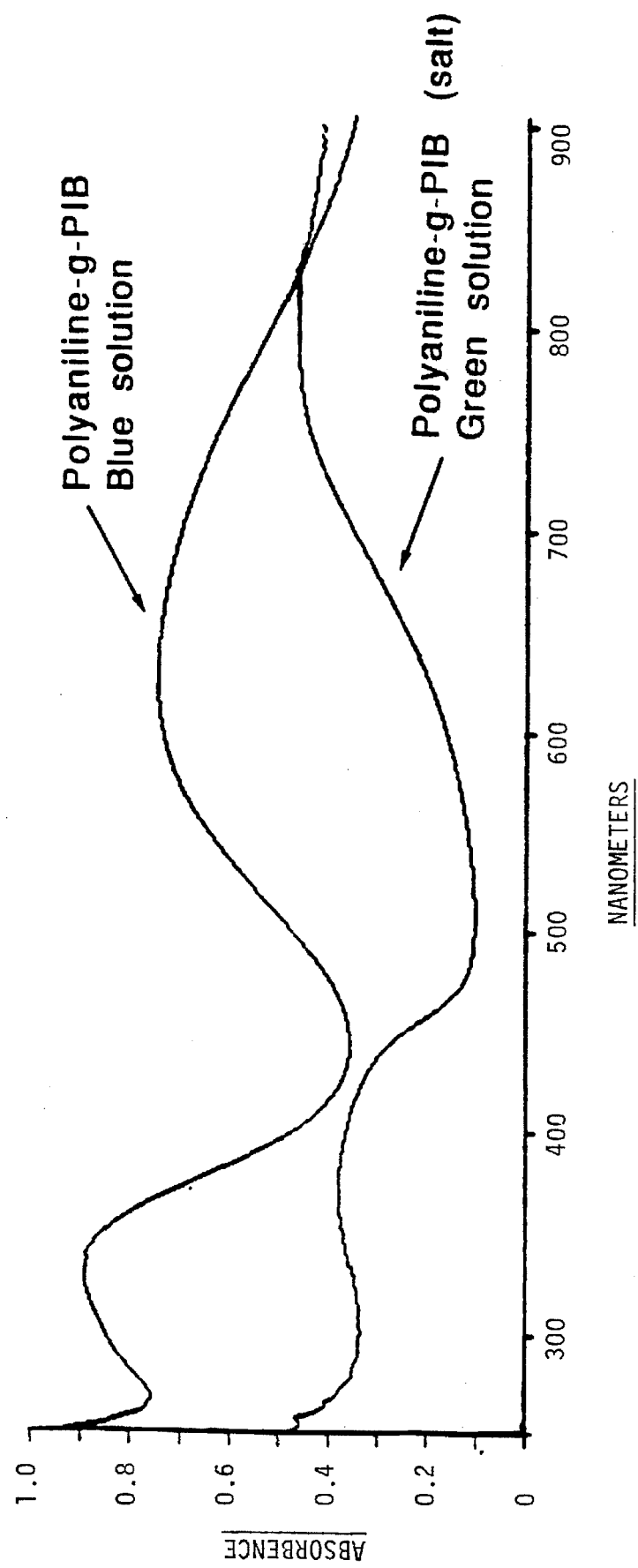
FIG. 1 is a graphical plot of the solution electronic absorption spectra obtained using ultraviolet-visible spectroscopy as described in Example 3.

The novel polymers of the present invention comprise nitrogen-containing polymers, such as ashless nitrogen-containing dispersant (e.g., polyisobutylene succinimides) and polyolefin-substituted amines, grafted with aromatic N-containing monomers, such as aniline, to provide oil soluble polymers having dispersant and antioxidant properties in oleaginous compositions, including fuel and lubricating oils. In fuels, the additives serve to minimize the degree of carburetor and fuel injector fouling from deposits. The novel polymers are also useful in electrically conductive devices.

In one embodiment of the invention, novel polymers are formed by (a) providing a N-containing polymer adduct containing reactive amino groups formed by contacting an amine compound having at least two reactive nitrogen moieties with at least one long chain hydrocarbon-substituted reactant in an amount and under conditions sufficient to form a nitrogen-containing polymer adduct, said long chain hydrocarbon-substituted reactant comprising at least one member selected from the group consisting of: (i) long chain hydrocarbons substituted with mono- or dicarboxylic acid, anhydride or ester groups; (ii) halogenated long chain hydrocarbons; (iii) mixtures of formaldehyde and a long chain hydrocarbyl substituted phenol; and (iv) mixtures of formaldehyde and a reaction product formed by reaction of long chain hydrocarbons substituted with mono- or dicarboxylic acid, anhydride or ester groups and an amino-substituted, optionally hydrocarbyl-substituted phenol, and (b) contacting said N-containing polymer adduct with at least one aromatic N-containing monomer under polymerization conditions to graft said N-containing polymer adduct with aromatic N-containing polymer segments.

In one preferred embodiment, the present invention is directed to a polyolefin-substituted dispersant and antioxidant additive useful in oleaginous compositions formed by (a) reacting in a liquid reaction mixture an amine compound having at least two reactive nitrogen moieties (e.g., ammonia or a polyamine such as a polyalkylene polyamine) with a long chain hydrocarbyl substituted mono- or dicarboxylic acid material comprising a polyolefin, derived from a $C_2$ to $C_{10}$ monoolefin and having a 300 to 10,000 number average molecular weight, substituted with at least 0.5 (e.g., from about 1 to 4) mono- or dicarboxylic acid producing moieties (preferably acid or anhydride moieties) per polyolefin molecule to form an N-acylated polymer substituted adduct having reactive amine groups, and (b) contacting said N-acylated polymer adduct with at least one aromatic N-containing monomer under polymerization conditions to graft said N-acylated polymer adduct with an aromatic N-containing polymer segments.

DETAILED DESCRIPTION OF THE INVENTION

AMINE COMPOUND

As described below, the N-containing polymer adduct employed in the present invention is prepared by contacting a long chain hydrocarbon substituted reactant with an amine compound containing at least two (e.g., from 2 to 20), preferably at least 3 (e.g., from 3 to 15), and most preferably from 3 to 8, reactive nitrogen moieties (that is, the total of the nitrogen-bonded H atoms) per molecule of the amine compound. The amine compound will generally comprise at least one member selected from the group consisting of ammonia, organic primary monoamines and organic polyamines containing at least one primary amine group or at least two secondary amine groups per molecule. Generally, the organic amines will contain from about 2 to 60, preferably 2 to 40 (e.g. 3 to 20), total carbon atoms and about 2 to 12, preferably 3 to 12, and most preferably from 3 to 8 (e.g., 5 to 9) total nitrogen atoms in the molecule. These amines may be hydrocarbyl amines or may be hydrocarbyl amines including other groups, e.g, hydroxy groups, alkoxy groups, amide groups, nitriles, imidazoline groups, and the like. Hydroxy amines with 1 to 6 hydroxy groups, preferably 1 to 3 hydroxy groups are particularly useful. Preferred amines are aliphatic saturated amines, including those of the general formulas:

and

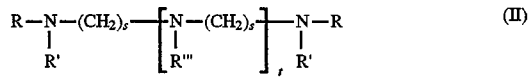

wherein R, R', R" and R'" are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; and wherein R'" can additionally comprise a moiety of the formula:

wherein R' is as defined above, and wherein s and s' can be the same or a different number of from 2 to 6, preferably 2 to 4; and t and t' can be the same or different and are numbers of from 0 to 10, preferably 2 to 7, and most preferably about 3 to 7, with the proviso that the sum of t and t' is not greater than 15. To assure a facile reaction, it is preferred that R, R', R", R'", s, s', t and t' be selected in a manner sufficient to provide the compounds of Formulas I and II with typically at least one primary or secondary amine group, preferably at least two primary or secondary amine groups. This can be achieved by selecting at least one of said R, R', R" or R'" groups to be hydrogen or by letting t in Formula II be at least one when R'" is H or when the III moiety possesses a secondary amino group.

Non-limiting examples of suitable organic amine compounds include: 1,2-diaminoethane; 1,3-diaminopropane; 1,4-diaminobutane; 1,6-diaminohexane; polyethylene amines such as diethylene triamine; triethylene tetra; tetraethylene pentamine; polypropylene amines such as 1,2-propylene diamine; di-(1,2-propylene)triamine; di-(1,3-propylene) triamine; N,N-dimethyl-1,3-diaminopropane; N,N-di-(2-aminoethyl) ethylene diamine; N,N-di(2-hydroxyethyl)-1,3-propylene diamine; 3-dodecyloxypropylamine; N-dodecyl-1,3-propane diamine; tris hydroxymethylaminomethane (THAM); diisopropanol amine; diethanol amine; triethanol amine; mono-, di-, and tri-tallow amines; amino morpholines such as N-(3-aminopropyl)morpholine; and mixtures thereof.

Other useful amine compounds include: alicyclic diamines such as 1,4-di(aminomethyl) cyclohexane, and heterocyclic nitrogen compounds such as imidazolines, and N-aminoalkyl piperazines of the general formula (IV):

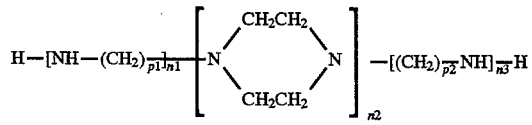

wherein $P_1$ and $P_2$ are the same or different and are each integers of from 1 to 4, and $n_1$, $n_2$ and $n_3$ are the same or different and are each integers of from 1 to 3. Non-limiting examples of such amines include 2-pentadecyl imidazoline: N-(2-aminoethyl) piperazine; etc.

Commercial mixtures of amine compounds may advantageously be used. For example, one process for preparing alkylene amines involves the reaction of an involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetra, tetraethylene pentamine and isomeric piperazines. Low cost poly (ethyleneamines) compounds averaging about 5 to 7 nitrogen atoms per molecule are available commercially under trade names such as "Polyamine H", "Polyamine 400", "Dow Polyamine E-100", etc.

Useful amines also include polyoxyalkylene polyamines such as those of the formulae:

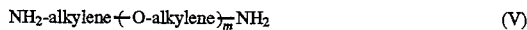   (V)

where m has a value of about 3 to 70 and preferably 10 to 35; and

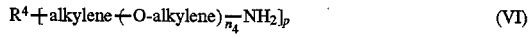   (VI)

where "$n_4$" has a value of about 1 to 40 with the provision that the sum of all the $n_4$'s is from about 3 to about 70 and preferably from about 6 to about 35, and $R^4$ is a polyvalent saturated hydrocarbon radical of up to ten carbon atoms wherein the number of substituents on the $R^4$ group is represented by the value of "p", which is a number of from 3 to 6. The alkylene groups in either formula (V) or (VI) may be straight or branched chains containing about 2 to 7, and preferably about 2 to 4 carbon atoms.

The polyoxyalkylene polyamines of formulas (V) or (VI) above, preferably polyoxyalkylene diamines and polyoxyalkylene triamines, may have average molecular weights ranging from about 200 to about 4000 and preferably from about 400 to about 2000. The preferred polyoxyalkylene polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-230, D-400, D-1000, D-2000, T-403", etc.

Additional amines useful in the present invention are described in U.S. Pat. No. 3,445,441, the disclosure of which is hereby incorporated by reference in its entirety.

The amine compound can comprise an amido-amine formed by reacting a polyamine with an alpha, beta-ethylenically unsaturated compound (e.g., of formula XXII), e.g. by reacting polyethylene amines (e.g., tetraethylene pentaamine, pentaethylene hexamine, and the like), polyoxyethylene and polyoxypropylene amines, e.g., polyoxypropylene diamine, trismethylolaminomethane and pentaerythritol, and combinations thereof, with with an acrylate-type compound, and most preferably with an acrylate-type reactant selected from the group consisting of lower alkyl alky-acrylates (e.g., methyl, ethyl, iso-propyl, propyl, iso-butyl, n-butyl, tert-butyl, etc., esters of methacrylic acid, acrylic acid, and the like).

Exemplary of such amido-amines are compounds of the formula:

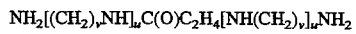

wherein u is an integer of from 1 to 10, and v is an integer of from 2 to 6.

Most preferred as the amine compound are members selected from the group consisting of ammonia and organic diprimary amines having from 2 to 12 carbon atoms and from 2 to 8 nitrogen atoms per molecule. Examples of such preferred organic diprimary amines are ethylene diamine, propylene diamine, diethylene triamine, dipropylene triamine, triethylene tetraamine, tripropylene tetraamine, tetraethylene pentaamine, tetrapropylene pentaamine, polyhexamethylene diamine, phenyl diamine.

PREPARATION OF LONG CHAIN HYDROCARBYL SUBSTITUTED REACTANT (A) The long chain hydrocarbyl polymer-substituted mono- or dicarboxylic acid material, i.e., acid, anhydride or acid ester used in this invention, includes the reaction product of a long chain hydrocarbon polymer, generally a polyolefin, with a monounsaturated carboxylic reactant comprising at least one member selected from the group consisting of (i) monounsaturated $C_4$ to $C_{10}$ dicarboxylic acid (preferably wherein (a) the carboxyl groups are vicinyl, (i.e. located on adjacent carbon atoms) and (b) at least one, preferably both, of said adjacent carbon atoms are part of said mono unsaturation); (ii) derivatives of (i) such as anhydrides or $C_1$ to $C_5$ alcohol derived mono- or di-esters of (i); (iii) monounsaturated $C_3$ to $C_{10}$ monocarboxylic acid wherein the carbon-carbon double bond is conjugated to the carboxy group, i.e, of the structure

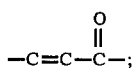

and (iv) derivatives of (iii) such as $C_1$ to $C_5$ alcohol derived monoesters of (iii). Upon reaction with the polymer, the monounsaturation of the monounsaturated carboxylic reactant becomes saturated. Thus, for example, maleic anhydride becomes a polymer substituted succinic anhydride, and acrylic acid becomes a polymer substituted propionic acid.

Typically, from about 0.7 to about 4.0 (e.g., 0.8 to 2.6), preferably from about 1.0 to about 2.0, and most preferably from about 1.1 to about 1.7 moles of said monounsaturated carboxylic reactant are charged to the reactor per mole of polymer charged.

Normally, not all of the polymer reacts with the monounsaturated carboxylic reactant and the reaction mixture will contain non-acid substituted polymer. The polymer-substituted mono- or dicarboxylic acid material (also referred to herein as "functionalized" polymer or polyolefin), non-acid substituted polyolefin, and any other polymeric by-products, e.g. chlorinated polyolefin, (also referred to herein as "unfunctionalized" polymer) are collectively referred to herein as "product residue" or "product mixture". The non-acid substituted polymer is typically not removed from the reaction mixture (because such removal is difficult and would be commercially infeasible) and the product mixture, stripped of any monounsaturated carboxylic reactant is employed for further reaction with the amine or alcohol as described hereinafter to make the dispersant.

Characterization of the average number of moles of monounsaturated carboxylic reactant which have reacted per mole of polymer charged to the reaction (whether it has undergone reaction or not) is defined herein as functionality. Said functionality is based upon (i) determination of the saponification number of the resulting product mixture using potassium hydroxide; and (ii) the number average molecular weight of the polymer charged, using techniques well known in the art. Functionality is defined solely with reference to the resulting product mixture. Although the amount of said reacted polymer contained in the resulting product mixture can be subsequently modified, i.e. increased or decreased by techniques known in the art, such modifications do not alter functionality as defined above. The terms "polymer substituted monocarboxylic acid material" and "polymer substituted dicarboxylic acid material" as used herein are intended to refer to the product mixture whether it has undergone such modification or not.

Accordingly, the functionality of the polymer substituted mono- and dicarboxylic acid material will be typically at least about 0.5, preferably at least about 0.8, and most preferably at least about 0.9 and will vary typically from about 0.5 to about 2.8 (e.g., 0.6 to 2), preferably from about 0.8 to about 1.4, and most preferably from about 0.9 to about 1.3.

Exemplary of such monounsaturated carboxylic reactants are fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, methyl fumarate, etc.

Preferred olefin polymers for reaction with the monounsaturated carboxylic reactants to form reactant A are polymers comprising a major molar amount of $C_2$ to $C_{10}$, e.g., $C_2$ to $C_5$ monoolefin. Such olefins include ethylene, propylene, butylene, isobutylene, pentene, octene-1, styrene, etc. The polymers can be homopolymers such as polyisobutylene, as well as copolymers of two or more of such olefins such as copolymers of: ethylene and propylene; butylene and isobutylene; propylene and isobutylene; etc. Mixtures of polymers prepared by polymerization of mixtures of isobutylene, butene-1 and butene-2, e.g., polyisobutylene wherein up to about 40% of the monomer units are derived from butene-1 and butene-2, is an exemplary, and preferred, olefin polymer. Other copolymers include those in which a minor molar amount of the copolymer monomers, e.g., 1 to 10 mole %, is a $C_4$ to $C_{18}$ non-conjugated diolefin, e.g., a copolymer of isobutylene and butadiene; or a copolymer of ethylene, propylene and 1,4-hexadiene; etc.

In some cases, the olefin polymer may be completely saturated, for example an ethylene-propylene copolymer made by a Ziegler-Natta synthesis using hydrogen as a moderator to control molecular weight.

The olefin polymers used in the formation of reactant A will have number average molecular weights within the range of about 300 to 10,000, generally from about 700 and about 5,000, preferably from about 1000 to 4,000, more preferably between about 1300 and about 3,000. Particularly useful olefin polymers have number average molecular weights within the range of about 1500 and about 3000 with approximately one terminal double bond per polymer chain. An especially useful starting material for highly potent dispersant additives useful in accordance with this invention is polyisobutylene, wherein up to about 40% of the monomer units are derived from butene-1 and/or butene-2. The number average molecular weight for such polymers can be determined by several known techniques. A convenient method for such determination is by gel permeation chromatography (GPC) which additionally provides molecular weight distribution information, see W. W. Yau, J. J. Kirkland and D. D. Bly, "Modern Size Exclusion Liquid Chromatography", John Wiley and Sons, New York, 1979.

The olefin polymers will generally have a molecular weight distribution (the ratio of the weight average molecular weight to number average molecular weight, i.e. $\overline{M}_w/\overline{M}_n$) of from about 1.0 to 4.5, and more typically from about 1.5 to 3.0.

The polymer can be reacted with the monounsaturated carboxylic reactant by a variety of methods. For example, the polymer can be first halogenated, chlorinated or brominated to about 1 to 8 wt. %, preferably 3 to 7 wt. % chlorine, or bromine, based on the weight of polymer, by passing the chlorine or bromine through the polymer at a temperature of 60° to 250° C., preferably 110° to 160° C., e.g. 120° to 140° C., for about 0.5 to 10, preferably 1 to 7 hours. The halogenated polymer may then be reacted with sufficient monounsaturated carboxylic reactant at 100° to 250° C., usually about 180° to 235° C., for about 0.5 to 10, e.g. 3 to 8 hours, so the product obtained will contain the desired number of moles of the monounsaturated carboxylic reactant per mole of the halogenated polymer. Processes of this general type are taught in U.S. Pat. Nos. 3,087,436; 3,172,892; 3,272,746 and others. Alternatively, the polymer and the monounsaturated carboxylic reactant are mixed and heated while adding chlorine to the hot material. Processes of this type are disclosed in U.S. Pat. Nos. 3,215,707; 3,231,587; 3,912,764; 4,110,349; 4,234,435; and in U.K. 1,440,219.

Alternately, the polymer and the monounsaturated carboxylic reactant can be contacted at elevated temperature to cause a thermal "ene" reaction to take place. Thermal "ene" reactions have been heretofore described in U.S. Pat. No. 3,361,673 and U.S. Pat. No. 3,401,118, the disclosures of which are hereby incorporated by reference in their entirety.

Preferably, the polymers used in this invention contain less than 5 wt %, more preferably less than 2 wt %, and most preferably less than 1 wt % of a polymer fraction comprising polymer molecules having a molecular weight of less than about 300, as determined by high temperature gel premeation chromatography employing the corresponding polymer calibration curve. Such preferred polymers have been found to permit the preparation of reaction products, particularly when employing maleic anhydride as the unsaturated acid reactant, with decreased sediment. In the event the polymer produced as described above contains greater than about 5 wt % of such a low molecular weight polymer fraction, the polymer can be first treated by conventional means to remove the low molecular weight fraction to the desired level prior to initiating the ene reaction, and preferably prior to contacting the polymer with the selected unsaturated carboxylic reactant(s). For example, the polymer can be heated, preferably with inert gas (e.g., nitrogen) stripping, at elevated temperature under a reduced pressure to volatilize the low molecular weight polymer components which can then be removed from the heat treatment vessel. The precise temperature, pressure and time for such heat treatment can vary widely depending on such factors as as the polymer number average molecular weight, the amount of the low molecular weight fraction to be removed, the particular monomers employed and other factors. Generally, a temperature of from about 60° to 100° C. and a pressure of from about 0.1 to 0.9 atmospheres and a time of from about 0.5 to 20 hours (e.g., 2 to 8 hours) will be sufficient.

In this process, the selected polymer and monounsaturated carboxylic reactant and halogen (e.g., chlorine gas), where employed, are contacted for a time and under conditions effective to form the desired polymer substituted mono- or dicarboxylic acid material. Generally, the polymer and monounsaturated carboxylic reactant will be contacted in a unsaturated carboxylic reactant to polymer mole ratio usually from about 0.7:1 to 4:1, and preferably from about 1:1 to 2:1, at an elevated temperature, generally from about 120° to 260° C., preferably from about 160° to 240° C. The mole ratio of halogen to monounsaturated carboxylic reactant charged will also vary and will generally range from about 0.5:1 to 4:1, and more typically from about 0.7:1 to 2:1 (e.g., from about 0.9 to 1.4:1). The reaction will be generally carried out, with stirring for a time of from about 1 to 20 hours, preferably from about 2 to 6 hours.

By the use of halogen, about 65 to 95 wt. % of the polyolefin, e.g. polyisobutylene will normally react with the monounsaturated carboxylic acid reactant. Upon carrying out a thermal reaction without the use of halogen or a catalyst, then usually only about 50 to 75 wt. % of the polyisobutylene will react. Chlorination helps increase the reactivity. For convenience, the aforesaid functionality ratios of mono- or dicarboxylic acid producing units to polyolefin, e.g., 1.1 to 1.8, etc. are based upon the total amount of polyolefin, that is, the total of both the reacted and unreacted polyolefin, used to make the product.

The reaction is preferably conducted in the substantial absence of $O_2$ and water (to avoid competing side reactions), and to this end can be conducted in an atmosphere of dry $N_2$ gas or other gas inert under the reaction conditions. The reactants can be charged separately or together as a mixture to the reaction zone, and the reaction can be carried out continuously, semi-continuously or batchwise. Although not generally necessary, the reaction can be carried out in the presence of a liquid diluent or solvent, e.g., a hydrocarbon diluent such as mineral lubricating oil, toluene, xylene, dichlorobenzene and the like. The polymer substituted mono- or dicarboxylic acid material thus formed can be recovered from the liquid reaction mixture, e.g., after stripping the reaction mixture, if desired, with an inert gas such as $N_2$ to remove unreacted unsaturated carboxylic reactant.

If desired, a catalyst or promoter for reaction of the olefin polymer and monounsaturated carboxylic reactant (whether the olefin polymer and monounsaturated carboxylic reactant are contacted in the presence or absence of halogen (e.g., chlorine)) can be employed in the reaction zone. Such catalyst of promoters include alkoxides of Ti, Zr, V and Al, and nickel salts (e.g., Ni acetoacetonate and Ni iodide) which catalysts or promoters will be generally employed in an amount of from about 1 to 5,000 ppm by weight, based on the mass of the reaction medium.

The selected amine compound(s) are readily reacted with the selected polymer substituted mono- or dicarboxylic acid material, e.g. alkenyl succinic anhydride, by heating an oil solution containing 5 to 95 wt. % of the polymer substituted dicarboxylic acid material to about 100° to 250° C., preferably 125° to 175° C., generally for 1 to 10, e.g. 2 to 6 hours until the desired amount of water is removed. The heating is preferably carried out to favor formation of imides and/or amides, rather than salts. Generally from 1 to 5, preferably from about 1.5 to 3 moles of mono- or dicarboxylic acid moiety content (e.g., grafted maleic anhydride or grafted acrylic acid content) is used per reactive nitrogen equivalent (preferably per equivalent of primary nitrogen) of the amine compound.

Preferably, the polymer substituted mono- or dicarboxylic acid producing material and amine compound will be contacted for a time and under conditions sufficient to form an adduct having within its structure, on average, at least 0.5 (e.g., from 0.5 to 20), and preferably at least 1 (e.g., from 1 to 15) reactive amine groups (i.e., primary and/or secondary amino groups) per molecule. The progress of this reaction can be followed by infra-red analysis.

The dispersant-forming reaction can be conducted in a polar or non-polar solvent (e.g., xylene, toluene, benzene and the like), and is preferably conducted in the presence of a mineral or synthetic lubricating oil.

(B) Also useful as long chain hydrocarbyl reactants to form the improved dispersants of this invention are halogenated long chain aliphatic hydrocarbons (as shown in U.S. Pat. Nos. 3,275,554, 3,438,757, 3,565,804, and U.S. Pat. No. 4,000,353, the disclosures of which are hereby incorporated by reference in their entirety) where the halogen group on the halogenated hydrocarbon is displaced with the nitrogen-containing compound in the subsequent reaction therewith.

For example, a polymer of a $C_2$ to $C_5$ monoolefin, e.g., polyethylene, polypropylene or polyisobutylene, wherein the polymer has an average molecular weight within the range of from 600 to about 3,000, preferably from about 800 to about 2,500, is halogenated with either bromine or chlorine; preferably the latter. The halogen may be conveniently added as gaseous chloride, liquid bromine, or a hydrohalogen, e.g., HCl or HBr gas.

The amount of halogen introduced will depend on the particular hydrocarbon used, the desired amount of amine to be introduced into the molecule, the particular alkylene amine used, and the halogen used. The amount of halogen introduced will generally be in the range from about 1 to 5 halogen atoms per molecule, depending on the reactivity of the resulting halide. On a weight percent basis, the amount of halide will generally range from about 1 to 25, more usually from about 1 to 10.

The halogenation step may be conducted in the temperature range of from about ordinary ambient temperatures to about 120° C. To aid in the halogenation step, the polymer may be dissolved in a suitable solvent, such as carbon tetrachloride, in order to lower the viscosity of the polymer, although the use of such a solvent is not necessary.

The time required for halogenation may be varied to some extent by the rate at which the halogen is introduced. Ordinarily from about 2 to about 5 hours is a satisfactory halogenation period. In a representative plant scale operation involving the chlorination of polyisobutylene of 830 molecular weight, a 100-pound batch will be chlorinated with 10 pounds of chlorine introduced into the reactor over a period of 3½ hours with a chlorination temperature of about 120° C.

The halohydrocarbon and amine compound (e.g., alkylene polyamine or polyalkylene polyamine) may be brought together neat or in the presence of an inert solvent, particularly a hydrocarbon solvent. The inert hydrocarbon solvent may be aliphatic or aromatic. Also, aliphatic alcohols may be used by themselves or in combination with another solvent, when capable of dissolving the reactants.

The reaction may be carried out at room temperature (20° C.), but elevated temperatures are preferred. Usually, the temperature will be in the range of from about 100° to 225° C. Depending on the temperature of the reaction, the particular halogen used, the mole ratios and the particular amine, as well as the reactant concentrations, the time may vary from 1 to 24 hours, more usually from about 3 to 20 hours. Times greatly in excess of 24 hours do not particularly enhance the yield and may lead to undesirable degradation. It is therefore preferred to limit the reaction time to fewer than 24 hours.

The mole ratio of halohydrocarbon to amine compound will generally be in the range from about 0.2 to 10 moles of amine compound per mole of halohydrocarbon, more usually 0.5 to 5 moles of amine compound per mole of halohydrocarbon. The mole ratio will depend upon the amount of halogen present in the halohydrocarbon, the particular halogen and the desired ratio of hydrocarbon to amine compound.

Small amounts of residual halogen in the final composition are not deleterious. Generally, the residual halogen, as bound halogen, will be in the range of 0 to 10 weight percent of the composition. Small amounts of halogen may be present as the hydrohalide salt of the hydrocarbon substituted alkylene polyamines.

Generally, the hydrocarbons used will have aliphatic unsaturation. In particular instances, the amines may react in a way resulting in the elimination of hydrogen halide, introducing further aliphatic unsaturation into the hydrocarbon radical. Therefore, the hydrocarbon radicals usually will be olefinically unsaturated. However, the olefinic unsaturation does not significantly affect the utility of the product, and when available, saturated aliphatic halide may be used.

After the reaction has been carried out for a sufficient length of time, the reaction mixture may be extracted with a hydrocarbon medium to free the product from any low molecular weight amine salt which has formed. The product may then be isolated by evaporation of the solvent. Further separation from unreacted hydrocarbon or purification may be carried out as desired, e.g., chromatography.

(C) Another class of long chain hydrocarbyl reactants to form the improved dispersants of this invention are any of the long chain hydrocarbyl-substituted hydroxy aromatic compounds which are known in the art as useful for forming Mannich condensation products. Such Mannich condensation products generally are prepared by condensing about 1 mole of a high molecular weight hydrocarbyl substituted hydroxy aromatic compound (e.g., having a number average molecular weight of 700 or greater) with about 1 to 2.5 moles of an aldehyde such as formaldehyde or paraformaldehyde and about 0.5 to 2 moles of the second adduct, using the condensation conditions as disclosed, e.g., in U.S. Pat. Nos. 3,442,808; 3,649,229; and U.S. Pat. No. 3,798,165 (the disclosures which are hereby incorporated by reference in their entirety). Such Mannich condensation products may include a long chain, high molecular weight hydrocarbon on the phenol group or may be reacted with a compound containing such a hydrocarbon, e.g., polyalkenyl succinic anhydride as shown in said aforementioned U.S. Pat. No. 3,442,808.

The optionally substituted hydroxy aromatic compounds used in the preparation of the Mannich base products include those compounds having the formula

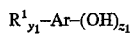

wherein Ar represents

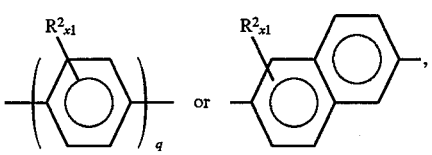

wherein q is 1 or 2, $R^1$ is a long chain hydrocarbon, $R^2$ is a hydrocarbon or substituted hydrocarbon radical having from 1 to about 3 carbon atoms or a halogen radical such as the bromide or chloride radical, $y_1$ is an integer from 1 to 2, $x_1$ is an integer from 0 to 2, and $z_1$ is an integer from 1 to 2.

Illustrative of such Ar groups are phenylene, biphenylene, naphthylene and the like.

The long chain hydrocarbon $R^1$ substituents are olefin polymers as described above for those olefin polymers useful informing reactants.

Representative hydrocarbyl substituted hydroxy aromatic compounds contemplated for use in the present invention include, but are not limited to, 2-polypropylene phenol, 3-polypropylene phenol, 4-polypropylene phenol, 2-polybutylene phenol, 3-polyisobutylene phenol, 4-polyisobutylene phenol, 4-polyisobutylene-2-chlorophenol, 4-polyisobutylene-2-methylphenol, and the like.

Suitable hydrocarbyl-substitued polyhydroxy aromatic compounds include the polyolefin catechols, the polyolefin resorcinols, and the polyolefin hydroquinones, e.g., 4-polyisobutylene-1,2-dihydroxybenzene, 3-polypropylene-1,2-dihydroxybenzene, 5-polyisobutylene-1,3-dihydroxybenzene, 4-polyamylene-1,3-dihydroxybenzene, and the like.

Suitable hydrocarbyl-substituted naphthols include 1-polyisobutylene-5-hydroxynaphthalene, 1-polypropylene-3-hydroxynaphthalene and the like.

(D) Still another class of long chain hydrocarbyl reactants to form the improved dispersants of this invention are the Mannich base aminophenol-type condensation products as they are known in the art. Such Mannich condensation products generally are prepared by reacting about 1 mole of long chain hydrocarbon substituted mono and dicarboxylic acids or their anhydrides (e.g., polyisobutylene-substituted succinic anhydride) with an about 1 mole of amine-substituted hydroxy aromatic compound (e.g., aminophenol), which aromatic compound can also be halogen- or hydrocarbyl-substituted, to form a long chain hydrocarbon substituted amide or imide-containing phenol intermediate adduct (generally having a number average molecular weight of 700 or greater), and condensing about a molar proportion of the long chain hydrocarbon substituted amide- or imide-containing phenol intermediate adduct with about 1 to 2.5 moles of formaldehyde and about 0.5 to 2 moles of the second adduct of this invention.

Suitable aminophenols include 2-aminophenol, 3-aminophenol, 4-aminophenol, 4-amino-3-methylphenol, 4-amino-3-chlorophenol, 4-amino-2-bromophenol and 4-amino-3-ethylphenol.

The preparation and use of the hydroxy aromatic compounds and amino-substituted hydroxy aromatic compounds, and methods useful for reaction thereof with an aldehyde and the selected amine compound of this invention are as described in U.S. Pat. No. 4,820,432 and U.S. Pat. No. 4,828,742, the disclosures of which are hereby incorporated herein in their entirety.

As with the adducts formed from reaction of an amine and long chain hydrocarbyl reactant A, the adducts formed by reaction of amines and long chain hydrocarbyl reactants B, C and D will preferably have within their structure, on average, at least about 0.5 (e.g., from about 0.5 to 20), and preferably at about 1 (e.g., from about 1 to 15) reactive amine groups per molecule.

PREPARATION OF THE N-CONTAINING POLYMER ADDUCT

Preparation of N-containing polymer adducts useful in the present invention can be illustrated as follows:

EXAMPLE A—PIB-Cl

Into a reaction flask is introduced 950 g. of polyisobutylene (approximate number average molecular weight=950) dissolved in 1,000 ml. of carbon tetrachloride. The mixture is stirred and chlorine is introduced at a rate of 235-250 ml. per minute, the temperature being maintained at 0° C. After the reaction mixture has taken up 51 g. of chlorine, the introduction of chlorine is terminated, the carbon tetrachloride is removed in vacuo and the chlorinated polyisobutylene isolated and analyzed. Analysis: wt. percent chlorine, 7.0.

EXAMPLE B—PIB-Succinimide

Into a reaction flask is introduced 225 g. of N-bromosuccinimide, 750 g. of polyisobutylene (approximately 930 number average molecular weight) and 750 ml. of carbon tetrachloride, the flask swept with nitrogen and the solution heated to 70° C. while maintaining a positive nitrogen pressure on the flask. To the solution is then added dropwise 0.5 g. of benzoyl peroxide in 50 ml. of carbon tetrachloride. At the end of the addition, the solution is cooled and the succinimide filtered off. The carbon tetrachloride is removed in vacuo. Analysis: wt. percent bromine, 8.86.

EXAMPLE C—PIB-EDA

Into a reaction flask is charged 1,156 g. of chloropolyisobutylene of approximately 950 number average molecular weight chlorinated to 7.8 weight percent chlorine), 75 ml. of xylene and 330 ml. of ethylene diamine, followed by the addition of 330 ml. of n-butanol. The mixture is then raised to a temperature of 100° C. over one hour and the temperature is then raised to about 160° C. and maintained there for about 4½ hours. About 330 ml. of distillate is obtained while raising the temperature from 130° to 160° C. The reaction mixture is transferred to a separatory funnel with the aid of one liter of benzene, and the mixture is washed repeatedly first with a dilute aqueous solution of isopropyl alcohol, then with a dilute aqueous solution of a combination of isopropyl alcohol and butanol and finally with water. The volatile materials are then removed from a sample of the washed product by sparging with nitrogen to constant weight on a steam plate. Analysis: titrimetric equivalent wt., 806, equal to 1.74% N; wt. percent chlorine, 0.62.

1,434 g. or about half of the volatile solvents is removed from the main portion of the washed product. This solution containing about 25% volatile solvent (titrimetric equivalent weight=1,051) combined with 240 g. of a mixture of other materials prepared similarly to provide a final product having a titrimetric equivalent weight of 985, the product being polyisobutenyl ethylene diamine.

EXAMPLE D—pIB-EDA

Into a reaction flask is introduced 1,000 g. of chloropolyisobutene (polyisobutene of approximately 420 number average molecular weight chlorinated to approximately 8 weight percent chlorine), 270 ml. of ethylene diamine and 270 ml. of n-butanol. The mixture is heated gradually to 170° C. during 1½ hours; distillate is collected mainly between 130° C. and 160° C. The mixture is then heated for about 3 hours at 170° C. At the end of this time, 1,000 ml. of toluene and 250 ml. of methyl isobutyl carbonol are added and the mixture washed with dilute aqueous isopropyl alcohol followed by repeated washings with water. Some of the volatile solvents are then removed on a steam bath using a nitrogen stream. The combined products from two similar runs are then filtered, yielding 3,911 g. Analysis: titrimetric equivalent wt., 840, equal to 1.67 wt. percent N. Complete removal of volatile solvents from a small sample indicate the product contains about 40% solvents, i.e., toluene and methyl isobutyl carbinol.

EXAMPLE E—PIB-EDA

Following the procedure of Example D, 1,000 g. of chloropolypropylene (polypropylene of about number average 800 molecular weight chlorinated to about 6 weight percent chlorine) is reacted with 270 g. of ethylene diamine. The product as finished contains about 15% volatile solvents. Analysis: titrimetric equivalent wt., 1,080, equal to 1.3 wt. percent N.

EXAMPLE F—PIB-TEPA

Into a reaction flask is introduced 1,500 g. of chloropolyisobutylene (polyisobutylene of approximately 950 molecular weight chlorinated to 5.6 weight percent chlorine), 285 g. of alkylene polyamine having an average composition of tetraethylene pentamine and 1,200 ml. of benzene, the mixture is heated to reflux, followed by stripping off the benzene and heating the mixture at about 170° C. for about 4 hours. The mixture is then allowed to cool, diluted with equal volumes of mixed hexanes and absolute ethanol, heated to reflux and ⅓ volume of 10 weight percent aqueous sodium carbonate added. The phases are separated, and the organic phase is washed with water, followed by removing the volatile materials in vacuo. Analysis: wt. percent N, 4.15; molecular weight (ThermoNam), 1,539.

EXAMPLE G—PIB-EDA

Following the procedure of Example D, 950 g. of chloropolyisobutylene (polyisobutylene of approximately 950

$\overline{M}_n$ chlorinated to 4.48 weight percent chlorine) is combined with 270 ml. of ethylene diamine (EDA) in 270 ml. of n-butanol. The product as finished contains about 20 percent volatile solvents. Analysis: titrimetric equivalent wt., 976, equal to 1.44 wt. percent N.

EXAMPLE H—PIB-NH$_2$

Into a high pressure bomb is introduced 1,200 g. of polyisobutenyl chloride (polyisobutylene of approximately 500 $\overline{M}_n$, chlorinated to 8 wt. percent chlorine) and 400 g. of liquid ammonia, the bomb sealed and heated at 150° C. with rocking for about 15 hours. After cooling, the pressure is vented and the reaction mixture taken up in mixed hexanes, water and alcohol. The organic phase is then washed with 500 ml. of 5 percent sodium hydroxide, followed by repeated washings with water. The solvents are then distilled off and the residue, which weighed 767 g., is filtered through Celite to recover the PIB-NH$_2$.

EXAMPLE I—PIBSA-Amino phenol-TEPA Mannich Base (a) A polyisobutenyl succinic anhydride having a SA:PIB ratio of 1.13 is prepared by heating a mixture of 100 parts of polyisobutylene (2225 $\overline{M}_n$; $\overline{M}_w/\overline{M}_n$=2.5) with 6.14 parts of maleic anhydride to a temperature of about 220° C. When the temperature reaches 120° C., the chlorine addition is begun and 5.07 parts of chlorine at a constant rate are added to the hot mixture for about 5.5 hours. The reaction mixture is then heated at 220° C. for about 1.5 hours and then stripped with nitrogen for about one hour. The resulting polyisobutenyl succinic anhydride has an ASTM Saponification Number of 54. The PIBSA product is 80 wt. % active ingredient (A.I.), the remainder being primarily unreacted PIB.

(b) A mixture containing 104 g. (0.05 mole) of the polyisobutylene polymer substituted succinic anhydride material so prepared, 5.45 g. (0.05 mole) of 4-aminophenol and 67 g. of S150N lubricating oil is stirred and slowly heated to 160° C. while under a nitrogen blanket. The reaction mixture is then heated at 160° C. for 3 hours and filtered. The resulting oil solution of polyisobutylene polymer substituted N-(hydroxyphenyl) succinimide analyzes for 0.22 wt % N.

(c) About 59.6 g. (0.014 mole) of the N-(hydroxyphenyl) polyisobutylene polymer substituted succinimide solution so prepared is mixed with 2.0 g. (0.0125 equivalent of primary N) of tetraethylene pentaamine (TEPA), 0.46 g. (0.015 mole) of formaldehyde, and 2.5 g. of S150N and reacted at 80° C. for one hour under nitrogen atmosphere. The reaction mixture is then heated to 160° C. for one hour and stripped at 160° C. for another hour with nitrogen gas. The reaction product analyzes for 1.28 wt % N.

EXAMPLE J

A portion of the dispersant of Example I is reacted with boric acid to provide a S150N solution containing a borated polyisobutenyl succinimide having a nitrogen content of about 1.28 wt. %, a boron content of 0.23 wt. % (50% a.i.) and 50 wt. % of unreacted PIB and mineral oil (S150N).

EXAMPLE K—PIBSA-Amino phenol-TEPA Mannich Base (a) A polyisobutenyl succinic anhydride (PIBSA) having a SA:PIB ratio of 1.24, is prepared by heating a mixture of 100 parts of polyisobutylene (1320 $\overline{M}_n$; $\overline{M}_w/\overline{M}_n$=2.5) with 11 parts of maleic anhydride to a temperature of about 220° C. When the temperature reaches 120° C., the chlorine addition is begun and 10 parts of chlorine at a constant rate are added to the hot mixture for about 5 hours. The reaction mixture is then heated at 220° C. for about 1.5 hours and then stripped with nitrogen for about one hour. The resulting polyisobutenyl succinic anhydride was diluted with S150N mineral oil to obtain a product having an ASTM Saponification Number of 69. The PIBSA product is 59 wt. % active ingredient (A.I.), the remainder being primarily unreacted PIB and mineral oil.

(b) A mixture containing 104 g. (0.05 mole) of the polyisobutylene polymer substituted succinic anhydride material so prepared, 5.45 g. (0.05 mole) of 4-aminophenol and 67 g. of S150N lubricating oil is stirred and slowly heated to 160° C. while under a nitrogen blanket. The reaction mixture is then heated at 160° C. for 3 hours and filtered. The resulting oil solution of polyisobutylene polymer substituted N-(hydroxyphenyl) succinimide analyzes for 0.22 wt % N.

(c) About 59.6 g. (0.025) of the N-(hydroxyphenyl) polyisobutylene polymer substituted succinimide solution so prepared is mixed with 2.4 g. (0.0125 equivalent of primary N) of tetraethylene pentaamine (TEPA), 0.42 g. (0.014 mole) of formaldehyde, and 2.5 g. of S150N and reacted at 80° C. for one hour under nitrogen atmosphere. The reaction mixture is then heated to 160° C. for one hour and stripped at 160° C. for another hour with nitrogen gas. The reaction product analyzes for 1.52 wt % N.

EXAMPLE L—PIB-Phenol-TEPA Mannich Base (a) About 50 g. of polyisobutylene (2225 $\overline{M}_n$; $\overline{M}_w/\overline{M}_n$=2.5) is dissolved in 100 ml of chlorobenzene and added to a solution containing 10.45 g. of phenol in 300 ml of chlorobenzene. While stirring at room temperature under a nitrogen blanket, 0.5 g. of BF$_3$ gas was bubbled into the charged solution, and the reaction mixture was stirred while the temperature was increased to 50° C. for about 1 hour. The reaction mixture is then neutralized with gaseous ammonia until a neutral pH was obtained. The solution is filtered and the filtrate is heated to 150° C. to distill of the solvent and excess phenol. Analytical results showed 70% conversion to the desired polyisobutylene-substituted phenol.

(b) 25 Grams of the alkylated phenol so prepared is dissolved in 25 g. of S150N lubricating oil. To the solution is added 1.1 g. of TEPA and 0.35 g. of formaldehyde at 30° C. under N$_2$. The mixture is heated to 115° C. and kept at that temperature for 1 hour in a four necked round bottomed 500 mol flask. Then, the reaction mixture's temperature is raised to 130° C. while the reaction vessel was swept with dry N$_2$ gas for 45 minutes. The stripped reaction mixture was then cooled to room temperature, diluted with 100 ml. of heptane, and filtered. The filtrate was then stripped at 130° C. with dry N$_2$ gas to remove heptane.

EXAMPLE M (a) A polyisobutenyl succinic anhydride having a succinic anhydride (SA) to polyisobutenylene mole ratio (i.e., a SA:PIB ratio) of 1.04 is prepared by heating a mixture of 100 parts of polyisobutylene (940 $\overline{M}_n$; $\overline{M}_w/R_n$ approximately equal to 2.5) with 13 parts of maleic anhydride to a temperature of about 220° C. When the temperature reaches 120° C., the chlorine addition is begun and 10.5 parts of chlorine at a constant rate are added to the hot mixture for about 5.5 hours. The reaction mixture is then heated at 220°

C. for about 1.5 hours and then stripped with nitrogen for about one hour. The resulting polyisobutenyl succinic anhydride has an ASTM Saponification Number of 112. The PIBSA product is 90 wt. % active ingredient (A.I.), the remainder being primarily unreacted PIB.

(b) A mixture of 200 parts by weight of the PIBSA product formed in Example M(a) and 188 parts of S150 mineral oil is heated to 150° C. under $N_2$. Then 32.3 parts of amidoamine I were added dropwise while stirring and light nitrogen sparging. The mixture is nitrogen stripped at 150° C. for 3 hours and then filtered. The oil solution is found to have the nitrogen content of 2.37 wt. % and a kinematic viscosity of 107.4 cSt at 100° C.

(c) A mixture of 200 parts by weight of the PIBSA product formed in Example M(a) and 174.5 parts of S150 mineral oil is heated to 150° C. under $N_2$. Then 17.9 parts of tetraethylenepentaamine are added dropwise while stirring and light nitrogen sparging. The mixture is nitrogen stripped at 150° C. for 3 hours and then filtered. The oil solution is found to have the nitrogen content of 1.72 wt. % and a kinematic viscosity of 156.3 cSt at 100° C.

EXAMPLE N

A mixture of 200 parts by weight of the PIBSA product formed as in Example K(a) and 42 parts of S150 mineral oil is heated to 150° C. under $N_2$. Then 11.6 parts of tetraethylenepentaamine are added dropwise while stirring and light nitrogen sparging. The mixture is nitrogen stripped at 150° C. for 3 hours and then filtered. The oil solution is found to have the nitrogen content of 1.65 wt. % and a kinematic viscosity of 213.0 cSt at 100° C.

EXAMPLE O

A mixture of 200 parts by weight of the PIBSA product formed in Example I(a) and 119 parts of S150 mineral oil is heated to 150° C. under $N_2$. Then 8.8 parts of tetraethylenepentaamine are added dropwise while stirring and light nitrogen sparging. The mixture is nitrogen stripped at 150° C. for 3 hours and then filtered. The oil solution is found to have the nitrogen content of 1.05 wt. % and a kinematic viscosity of 487.8 cSt at 100° C.

EXAMPLE P (A) A polyisobutenyl propionic acid (PIBA) having a functionality of 1.09 is prepared by heating a mixture of 2,000 parts of polyisobutylene (2225 $\overline{M}_n$; $\overline{M}_w/\overline{M}_n$~2.5) while bubbling 120 g of chlorine gas for a period of 10 hours at 130°–140° C. The chlorinated PIB analyzed for 2.8 wt. % chlorine. To the chlorinated PIB at 120° C., 149.6 g of acrylic acid are added and the reaction mixture is slowly heated to 230° C. at a rate of 15°–20° C./hour while under nitrogen blanket. Thereafter the reaction product is soaked at 230° C. for two hours and nitrogen stripped at 230° C. for one hour. The filtered product analyzed for a total acid number (ASTM D-94) of 26.2 and 70.3 % active ingredient; the remaining being primarily unfunctionalized PIB.

(b) A mixture of 107 parts by weight of the PIBA product formed in Example (a) and 47 parts of S150 mineral oil is heated to 160° C. under $N_2$. Then 4.73 parts of tetraethylenepentaamine are added dropwise while stirring and light nitrogen sparging. The mixture is nitrogen stripped at 150° C. for 3 hours and then filtered. The oil solution is found to have the nitrogen content of 1.03 wt. %.

EXAMPLE Q

Using the procedure of Example P(b), a mixture of 107 parts by weight of the PIBA product formed in Example P(a) and 47.3 parts of S150 mineral oil is heated to 160° C. under $N_2$. Then 4.8 parts of a commercial polyethylene-polyamine (PAM containing an average of 12 carbon atoms and 6 nitrogen atoms per molecule), are added dropwise while stirring and light nitrogen sparging. The mixture is nitrogen stripped at 160° C. for 3 hours and then filtered. The oil solution is found to have the nitrogen content of 0.98 wt %.

EXAMPLE R 1.80 mole of polyisobutylene succinic anhydride (Sap. No. 48, 86 wt. % active ingredient) is prepared from 2225 $\overline{M}_n$ PIB via a simultaneous process with chlorine gas and maleic anhydride was charged into a reaction vessel with 2897 g. of mineral oil S150N and heated to 150° C. under nitrogen blanket. Thereafter, one mole of polyalkylene polyamine (as used in Example Q) is added to the reaction solution while nitrogen sparging for a period of one hour. After the addition is completed, the reaction mixture is nitrogen stripped at 150° C. for two hours and filtered. The product, a 52 wt. % oil solution of polyisobutenyl succinimide, analyzes for 0.88 wt. % nitrogen (of which 47 wt. % is secondary amino groups).

AROMATIC NITROGEN-CONTAINING MONOMER

The aromatic nitrogen-containing monomers (also referred to herein as "aromatic N-monomers") employed in the present invention contain one or more aromatic ring, wherein at least one aromatic ring is substituted by a –NH($R^a$) group, wherein $R^a$ is hydrogen or hydrocarbyl (e.g., $C_1$ to $C_{25}$ hydrocarbyl, and preferably H or $C_1$ to $C_3$ alkyl). Such aromatic N-monomers include compounds of the formula:

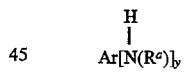

wherein Ar is a substituted or unsubstituted aromatic radical, $R^a$ is as defined above and y is an integer of at least 1 (e.g., 1 to 4, preferably 1–2).

The Ar radical will generally contain from 6 to 20 ring carbon atoms and can comprise a single aromatic ring, fused aromatic rings, or linked aromatic rings, and can be substituted or unsubstituted. Preferably, the substituents on the Ar radical are positioned ortho- and/or meta- to the N substituent. The Ar radical's substituents can be the same or different and can comprise $-Z^2$ or $-Z^1Z^2$ wherein $Z^1$ is a member selected from the group consisting of (a) a branched or straight chain alkylene group (e.g., $-C_nH_{2n}-$, wherein n is an integer of from 1 to 20, preferably from 1 to 6) which can contain one or more —O— or —S— chain atoms (e.g., $-(C_nH_{2n}X)_{n''}-$ wherein n' is an integer of from 1 to 6, preferably from 1 to 4, and n" is an integer of from 1 to 20, preferably from 1 to 6 and X is O or S), and (b) groups of the formula:

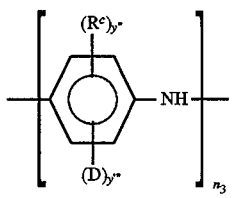

wherein $n_3$ is from 1 to 4 (and preferably 1 to 2), $R^c$ in each instance in which it appears is independently $C_1$ to $C_{12}$ alkyl (preferably $C_1$ to $C_4$ alkyl), D in each instance in which it appears is independently Cl, Br or I, y" is an integer of from 0 to 4 (preferably from 0 to 3), y'" is an integer of from 0 to 4 (preferably from 0 to 3), and wherein $R^b$ is H or $C_1$ to $C_{20}$ alkyl and y' is an integer of from 1 to 4 (preferably 1 or 2), with the proviso that the sum of y'y"+y'" is from 1 to 5 (preferably from 1 to 4, more preferably from 1 to 3), and wherein $Z^2$ is a member selected from the group consisting of H, —OH, —halide, —$R^c$, —$SO_3H$, —$PO_3H$, —$SO_3R^c$, —$PO_3R^c$, —$CO_2R^c$, —$CO_2H$ or —$NO_2$, wherein $R^c$ is hydrocarbyl (e.g., $C_1$ to $C_{12}$ hydrocarbyl). The Ar group, if substituted, will preferably be substituted by 1 to 3, more preferably 1 to 2, $C_1$ to $C_{20}$ hydrocarbyl (e.g., alkyl) groups, or with 1 to 3 halogen radicals (e.g., Cl—, Br—, or I—). Examples of suitable unsubstituted Ar groups are phenyl, naphthyl, bi-phenyl, terphenyl, quarterphenyl, quinquiphenyl, sexiphenyl, naphthylphenyl, phenylnaphthyl and the like. Examples of fused aromatic ring Ar systems are anthracene, phenanthrene, tetracene, acenaphthene and phenalene. Preferred polyaromatics are the polyphenylenes.

To avoid competing side reactions $R^a$ and $R^c$ are preferably substantially free of polymerizable ethylenically unsaturated double bonds.

Preferred aromatic N-monomers for use in the present invention comprise compounds of the formula:

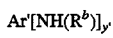

wherein Ar' is

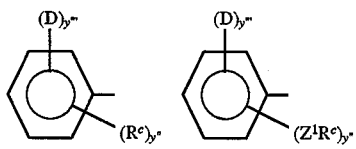

wherein $Z^1$ is as defined above, $R^c$ in each instance in which it appears is independently $C_1$ to $C_{12}$ alkyl (preferably $C_1$ to $C_4$ alkyl), D in each instance in which it appears is independently Cl, Br or I, y" is an integer of from 0 to 4 (preferably from 0 to 3), y'" is an integer of from 0 to 4 (preferably from 0 to 3), and wherein $R^b$ is H or $C_1$ to $C_{20}$ alkyl and y' is an integer of from i to 4 (preferably 1 or 2), with the proviso that the sum of y'+y"+y'" is from 1 to 5 (preferably from 1 to 4, more preferably from 1 to 3).

Illustrative of aromatic N-monomers useful in this invention are aniline, N-methyl aniline, N-ethyl aniline, N-propyl aniline, N-isopropyl aniline, N-(tert-butyl) aniline, 2-aminophenol, 3-aminophenol, 2-amino-4-chloro-6-nitrophenol, 2-amino-4,6-dichlorophenol, 2-amino- 4,6-dinitrophenol, 2-amino-4-chlorophenol, 2-amino-4-nitrophenol, 2-amino-1-phenol-4-sulfonamide; 3-amino-2-hydroxybenzoic acid, 2-amino-6-nitro-4-methylphenol, 6-amino-4-nitro-2-methylphenol, 2-amino-3-nitro-4-methylphenol, 2-amino-4-methylphenol, 2-amino-4-(methylsulfonyl)phenol, 3'-amino-2'-hydroxy-5'-nitroacetanilide, 3'-amino-4'-hydroxy-5'-nitroacetanilide, diphenylamine, 0-toluidine, m-toluidine, 2,3-xylidine, 2,5-xylidine, 2,6-xylidine, 3,5-xylidine, o-anisidine, m-anisidine, o-phenetidine, p-cresidine, acetanilide, acetoacetanilide, o-chloroaniline, m-chloroaniline, 2,5-dichloroaniline, 2-amino benzene sulfonic acid, 3-amino benzene sulfonic acid, o-nitroaniline, m-nitroaniline, naphthalene amines, such as: 1-(naphthylene)amine, 2-(naphthylene)amine, and the like, N-phenyl-2-napththalene amine, 8-amino-1-naphthalene carboxylic acid, N-(monosubstituted) amino-phenols, such as 3-anilinophenol, 3-ethylamino-4-methylphenol, 3-hydroxy-N-phenylaniline, 3-hydroxy-2'-methyldiphenylamine, 3-ethylaminophenol, 3-methylamino-4-methylphenol, 3-ethylamino-4-methylphenol, 4-anilinophenol, 4-acetaminophenol, 2-amino-3,6-dichloro-1-phenol-4-sulfonic acid, 2-amino-6-chloro-1-phenol-4-sulfonic acid, 3-amino-1-phenol-4-sulfonic acid, 2-amino-1-phenol-4-sulfonic acid, 5-amino-6-hydroxy-3-methylbenzenesulfonic acid, 4-acetamido-6-amino-1-phenol-2-sulfonic acid, 5-amino-1-naphthalenesulfonic acid, 5-amino-2-naphthalenesulfonic acid, 8-amino-2-naphthalenesulfonic acid, 8-amino-1-naphthalenesulfonic acid, 2-amino-1-naphthalenesulfonic acid, 6-amino-1-naphthalenesulfonic acid, 7-amino-2-naphthalenesulfonic acid, 7-amino-1-naphthalenesulfonic acid, 1-amino-2,7-naphthalenedisulfonic acid, 4-amino-2,7-naphthalenesulfonic acid, 4-amino-2,6-naphthalenedisulfonic acid, 8-amino-1,6-naphthalenedisulfonic acid, 5-amino-1,3-naphthalenedisulfonic acid, 3-amino-1,5-naphthalenedisulfonic acid, 5-amino-1-naphthalenol, 7-amino-2-naphthalenol, 4-hydroxy-8-amino-2-naphthalenesulfonic acid, 4-hydroxy-7-amino-2-naphthalenesulfonic acid, 4-amino-5-hydroxy-2,7-naphthalenedisulfonic acid, aniline HCl, aniline sulfate, and the like.

Preferred aromatic N-monomers are o-methylaniline, o-ethylaniline, o-methoxyaniline, o-phenylaniline, o-aminoaniline, o-fluroaniline, o-chloroaniline, o-nitroaniline, o-methylaniline, m-ethylaniline, m-methoxyaniline, m-chloroaniline, m-nitroaniline, p-phenylaniline, N-methylaniline, N-ethylaniline, N-benzylaniline, N-methylaniline, N-phenylaniline, and N-naphthylaniline, and mixtures thereof.

Most preferred aromatic N-monomers on the present invention are aniline, o-toluidine, m-toluidine, m-ethylaniline, and o-ethylaniline.

Grafting of Aromatic N-Monomer

The amino-substituted polymer is grafted with aromatic N-monomer in accordance with this invention by contacting the aromatic N-monomer and amino-substituted polymer under polymerizing conditions in a polymerization zone in the presence of an effective amount of an oxidizing agent.

Oxidizing agents which can be employed have a reducing single electron potential ($E°_{red}$) greater than 1.00 volt, preferably grater than 1.5 volts and more preferably greater than 1.7 volts (e.g., from 1.5 to 2.5). $E°_{red}$ values for standard half reactions are obtained from *Lange's Handbook of Chemistry*, 13th ed., page 6–2 to 6–5, (J. A. Dean, Ed., McGraw Hill Book Company (1985), which is incorporated herein by reference.

Examples of suitable oxidizing agents include chemical compounds which contain a metal ion which can change its valence, and also include non-metallic compounds. Examples are ammonium peroxydisulfate [$(NH_4)_2S_2O_8$], potassium iodate ($KIO_3$), iron (III) chloride ($FeCl_3$), sodium persulfate [Na$_2$S$_2$O$_8$], potassium persulfate [K$_2$S$_2$O$_8$], potassium dichromate (K$_2$Cr$_2$O$_7$), hydrogen peroxide (H$_2$O$_2$) (e.g., 30% solution in water), chromium trioxide [CrO$_3$], sodium chlorate [Na$_2$ClO$_3$], ammonium dichromate [(NH$_4$)$_2$Cr$_2$O$_7$], (NH$_4$)$_2$Ce(NO$_3$)$_6$, Ce(SO$_4$)$_2$, and the like.

The oxidizing agents can be dissolved in polar organic or inorganic solvents which are inert towards the particular oxidants used. Typical solvents are water, alcohols, acetonitrile, acetic acid, acetone, amides, ethers and the like. Typical concentrations for the oxidant are within the range 0.1–1.0 molar.

In practicing the instant invention, auxiliary acids including, but not limited to, mineral, carboxylic and sulfonic may be used in conjunction with the aforementioned inorganic or organic oxidants. Thus, acids such as sulfuric, hydrochloric, acetic, trifluoroacetic, methanesulfonic or trifluoromethanesulfonic can be employed. Such acid may be co-dissolved with the oxidant in a suitable solvent used as a solvent for the oxidant. Such added acids may be preferred but are not necessary in conjunction with the preferred oxidants. When auxiliary acids are added to the system, they are added in amounts in the range 0.01 to 100 moles acid/mole oxidant.

The oxidizing agent is generally employed in an amount of from 0.01 to 3 mole (and preferably from 0.2 to 1 mole) per mole of the aromatic N-monomer.

The conditions of temperature and pressure under which the polymerization is performed can vary widely, and generally temperatures of from about −20° to 100° C., preferably from about 0° to 30° C., will be employed. Temperatures of greater than 100° C. can be employed but can cause excessive thermal decomposition of the product and increased by-products (including homopolymer of the aromatic N-monomer, e.g., polyaniline homopolymer from aniline). Similarly, temperatures of less then −20° C. can be used, but uneconomically slow reaction rates can result. The pressure is preferably selected to maintain the polymer and monomer feed in substantially liquid form in the polymerization zone, and generally pressures from about 0.1 to 1000 kPa, and preferably from about 1 to 100 kPa, will be employed. As the polymerization reaction is slightly exothermic, the polymerization zone will be generally provided with a cooling means, which can comprise any of the conventionally used devices for cooling liquid media (e.g., external or internal reactor cooling coils, feedstream indirect heat exchanger(s), reaction liquid recycle through a pump around heat exchanger, introduction of a quench fluid (e.g., a cooled solvent or gas), and the like). Cooling of the polymerization reaction liquid can also be effected by evaporative cooling, as by continuously, or intermittently, introducing a low-boiling solvent which is evaporated from the surface of the reaction liquid.

The polymerization reaction time can vary widely, depending on such factors as the size of the reactor, the type, amounts and notes of the feedstreams charged, the temperatures employed, and other factors. Generally, however, the polymerization will be conducted for a time of from about 0.1 to 24 hours, preferably from about 1 to 15 hours and more preferably from about 2 to 6 hours.

The grafting polymerization reaction is believed to be an oxidation reaction, and therefore, the reactants are preferably charged in the substantial absence of reducing agents such as hydroquinone, NH$_4$OH, hydrazine, and the like, as these materials may impede the desired grafting reaction.

The polymerization can be effected in the presence or absence of a solvent. For example, suitable solvents include hydrocarbon solvents such as aliphatics, cycloaliphatics, and aromatic hydrocarbon solvents, or halogenated versions of such solvents. Preferred are C$_{12}$ or lower straight-chain or branched-chain, saturated hydrocarbons, and C$_5$ to C$_9$ saturated alicyclic or aromatic hydrocarbons, or C$_2$ to C$_6$ halogenated hydrocarbons. Examples of such solvents are hexane, butane, pentane, heptane, cyclopentane, cyclohexane, cycloheptane, methyl cyclopentane, methyl cyclohexane, isooctane, benzene, toluene, xylene, chloroform, chlorobenzene, tetrachloroethylene, dichloroethane and trichloroethane.

Generally, from 0.01 to 500 moles, preferably from about 0.1 to 200 moles, and more preferably from 0.1 to 100 moles, of aromatic N-monomer are charged to the polymerization zone per molar equivalent of reactive amine of the long chain hydrocarbon-substituted reactant charged. The number of molar equivalents of reactive amine is equal to the moles of long chain hydrocarbon-substituted reactant charged multiplied by the average number of reactive amine groups (i.e., primary or secondary amine groups) per molecule of the long chain hydrocarbon-substituted reactant. For example, in an interpolymer containing an average of 0.8 reactive amine groups per polymer molecule, for the purposes of the above charge ratios, one mole of the long chain hydrocarbon-substituted reactant contains 0.8 molar equivalents of reactive amino groups.

The concentration of aromatic-N-monomer units produced in the product polymer can vary widely. For lubricating oil additives, the grafted polymer will preferably contain from about 0.5 to 30 wt. %, and more preferably from about 1 to 10 wt. % monomer units derived from the aromatic N-monomer (e.g., aniline), and for electronic applications, the grafted polymer will preferably contain from about 20 to 80 wt. %, preferably 30 to 50 wt. % of monomer units derived from the aromatic-N-monomer (e.g., aniline).

The polymerization grafting reaction can be effected in a continuous, semi-continuous or batchwise manner, and can be carried out in any conventional reactor, such as in one or more stirred tank reactor, tubular reactor, and the like.

In the grafting process, the long chain hydrocarbon-substituted reactant and aromatic N-monomer are contacted with the acidic oxidizing solution. Under these conditions, the long chain hydrocarbon-substituted reactant is unable to homopolymerize as it lacks the polymerizable group. The aromatic N-monomer, however, readily polymerizes under these reaction conditions. The slow addition of the long chain hydrocarbon-substituted reactant already mixed with acidic oxiding solution or the slow addition of the aromatic N-monomer mixed with long chain hydrocarbon-substituted reactant to the acidic oxiding solution is essential for the prevention of significant homopolymerization of aromatic N-monomer.

The grafting reaction of long chain hydrocarbon-substituted reactants with aromatic N-monomers in accordance with this invention can be illustrated by the grafting of aniline onto a polyisobutylene-substituted amine (PIB-NH$_2$). Attempts to establish the exact structure of polyaniline have been difficult. The redox chemistry of polyaniline is complicated by the large number of possible chemical structures for the polyaniline in an idealized structure, the polymer's graft segment units formed in this invention can be written as follows:

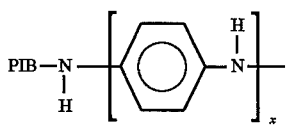

where x is a number of from 1 to 100,000, preferably from 2 to 1,000, and wherein PIB represents the balance of the polymer, which can contain an average of one or more such graft segments per polymer chain. However, under the preparation conditions of this invention, the structure of the grafted polyaniline polymer units can also be represented as follows:

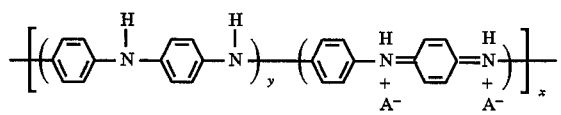

The above structure can also be seen as the polysemiquinone radical cation form:

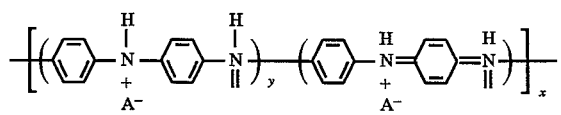

wherein A is an anion (e.g., chloride anion), x is an defined above, and y is 0.5 which polymer form will be herein called an emeraldine salt. The polymer can be reacted with 0.1M ammonium hydroxide to get polyaniline in the emeraldine base form.

The emeraldine base form of the grafted polymer of the present invention alternating reduced and oxidized repeat units can be presented as follows:

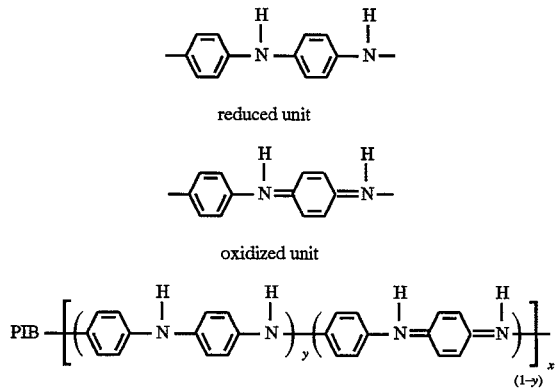

where again x and y are as defined above.

Furthermore, the repeating units can be protonated by Bronsted acid such as aqueous HCl to produce or regenerate the corresponding salt as shown above.

The grafted polymers prepared by the process of this invention are soluble in common organic solvents (including non-polar organic solvents) and in mineral oils, and possess electrically conducting properties. The novel polymers of this invention are useful in oleaginous compositions as dispersant-viscosity index improver additives, as dispersant additives, and possess antioxidant properties. The polymers of this invention are characterized by improved thermooxidative and thermal stability properties compared to the amino-substituted polymers from which they are prepared.

The polymers of this invention also find utility in other applications such as thermoplastic conductivity systems, soluble conductive systems capable of being cast into coherent films, additives for conventional thermoplastics, and the like. The novel polymers have high electrical conductivities, in general from 10 to $10^{-6}$>ohm$^{-1}$cm$^{-1}$, and good mechanical properties. The electrical conductivity (in ohms$^{-1}$cm$^{-1}$) is determined by applying conductive copper contacts to the film and carrying out the measurement by the two-point method.

The polymers of this invention find utility in the construction of light-weight rechargable storage batteries, electrochromic display devices, electo-optical switching and memory devices, neutron detectors, solar energy cells, ion exchangers, non-linear optic devices, molecule-based electronics, anti-static treatment of plastics and textiles and semiconductor components. They constitute an advance in the art, especially where good mechanical properties of the components, coupled with low specific gravity and well-balanced properties, are important.

It is not essential to remove homopolymer from graft polymer for electronic applications, but for lube additive applications homopolymer (if any is formed) could be removed by blending the grafted product with mineral oil (e.g. at temperatures of from about 80° C. to 100° C. for from about 4 to 8 hours) and then filtering this mixture to remove the homopolymer which is insoluble in mineral oil.

OLEAGINOUS COMPOSITIONS

The dispersants of the present invention can be incorporated into a lubricating oil (or a fuel in any convenient way. Thus, these mixtures can be added directly to the lubricating oil (or fuel) by dispersing or dissolving the same in the lubricating oil (or fuel) at the desired level of concentration of the dispersant. Such blending into the additional lubricating oil (or fuel) can occur at room temperature or elevated temperatures. Alternatively, the dispersants can be blended with a suitable oil-soluble solvent/diluent (such as benzene, xylene, toluene, lubricating base oils and petroleum distillates, including the various normally liquid fuels described in detail below) to form a concentrate, and then blending the concentrate with a lubricating oil (or fuel) to obtain the final formulation. Such dispersant concentrates will typically contain (on an active ingredient (A.I.) basis) from about 3 to about 45 wt. %, and preferably from about 10 to about 35 wt. %, dispersant additive, and typically from about 30 to 90 wt. %, preferably from about 40 to 60 wt. %, base oil, based on the concentrate weight.

The oil-soluble additives of the present invention possess very good dispersant and antioxidant properties as measured herein in a wide variety of environments. Accordingly, the additives are used by incorporation and dissolution into an oleaginous material such as fuels and lubricating oils. When the additives of this invention are used in normally liquid petroleum fuels such as middle distillates boiling from about 65° to 430° C., including kerosene, diesel fuels, home heating fuel oil, jet fuels, etc., a concentration of the additives in the fuel in the range of typically from about 0.001 to about 0.5, and preferably 0.005 to about 0.15 weight percent, based on the total weight of the composition, will usually be employed. The properties of such fuels are well known as illustrated, for example, by ASTM Specifications D #396-73 (Fuel Oils) and D #439-73 (Gasolines) available from the American Society for Testing Materials ("ASTM"), 1916 Race Street, Philadelphia, Pa. 19103. Normally liquid fuel compositions comprising non-hydrocarbonaceous materials such as alcohols, ethers, organo-nitro compounds and the like (e.g., methanol, ethanol, diethyl ether, methyl ethyl ether, nitromethane) are also within the scope of the invention. Such materials can be mixed with the hydrocarbon fuel in varying amounts of up to about 10–20% or more.

For example, alcohols such as methanol, ethanol, propanol and butanol, and mixtures of such alcohols are included in commercial fuels in amounts of up to about 10%. Other examples of materials which can be mixed with the fuels include diethyl ether, methyl ethyl ether, methyl tertiary butyl ether, and nitromethane. Also within the scope of the invention are liquid fuels derived from vegetable or mineral sources such as corn, alfalfa, shale and coal. Normally liquid fuels which are mixtures of one or more hydrocarbonaceous fuels and one or more non-hydrocarbonaceous materials are also contemplated.

The fuel compositions of this invention can contain, in addition to the products of this invention, other additives which are well known to those of skill in the art. These can include anti-knock agents such as tetraalkyl lead compounds, lead scavengers such as haloalkanes, deposit preventers or modifiers such as triaryl phosphates, dyes, cetane improvers, antioxidants such as 2,6-ditertiary-butyl-4-methylphenol, rust inhibitors, bacteriostatic agents, gum inhibitors, metal deactivators, upper cylinder lubricants and the like.

The additives of the present invention find their primary utility in lubricating oil compositions which employ a base oil in which the additives are dissolved or dispersed. Such base oils may be natural or synthetic. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additives of the present invention in base oils conventionally employed in and/or adapted for use as power transmitting fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

These lubricating oil formulations conventionally contain several different types of additives that will supply the characteristics that are required in the formulations. Among these types of additives are included viscosity index improvers, antioxidants, corrosion inhibitors, detergents, dispersants (especially ashless dispersants such as polyisobutylene succinimides and borated dreivatives thereof), pour point depressants, antiwear agents, friction modifiers, etc. as described in U.S. Pat. No. 4,797,219, the disclosure of which is hereby incorporated by reference in its entirety. Some of these numerous additives can provide a multiplicity of effects, e.g. a dispersant-oxidation inhibitor. This approach is well known and need not be further elaborated herein.

In the preparation of lubricating oil formulations it is common practice to introduce the additives in the form of 10 to 80 wt. %, e.g., 20 to 80 wt. % active ingredient concentrates in hydrocarbon oil, e.g. mineral lubricating oil, or other suitable solvent. Usually these concentrates may be diluted with 3 to 100, e.g., 5 to 40 parts by weight of lubricating oil, per part by weight of the additive package, in forming finished lubricants, e.g. crankcase motor oils. The purpose of concentrates, of course, is to make the handling of the various materials less difficult and awkward as well as to facilitate solution or dispersion in the final blend. Thus, a dispersant would be usually employed in the form of a 40 to 50 wt. % concentrate, for example, in a lubricating oil fraction.

The additives of the present invention will be generally used in admixture with a lube oil basestock, comprising an oil of lubricating viscosity, including natural and synthetic lubricating oils and mixtures thereof.

Natural oils include animal oils and vegetable oils (e.g., castor, lard oil) liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils.

Alkylene oxide polymers and interpolymers and derivatives thereof where the terminal hydroxyl groups have been modified by esterification, etherification, etc., constitute another class of known synthetic lubricating oils. These are exemplified by polyoxyalkylene polymers prepared by polymerization of ethylene oxide or propylene oxide, the alkyl and aryl ethers of these polyoxyalkylene polymers (e.g., methyl-poly isopropylene glycol ether having an average molecular weight of 1000, diphenyl ether of poly-ethylene glycol having a molecular weight of 500–1000, diethyl ether of polypropylene glycol having a molecular weight of 1000–1500); and mono- and poly- carboxylic esters thereof, for example, the acetic acid esters, mixed $C_3$–$C_8$ fatty acid esters and $C_{13}$ Oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g., butyl alcohol, hexyl alcohol, dodecyl alcohol, 2-ethylhexyl alcohol, ethylene glycol, diethylene glycol monoether, propylene glycol). Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol and tripentaerythritol.

Silicon-based oils such as the polyalkyl-, polyaryl-, polyalkoxy-, or polyaryloxysiloxane oils and silicate oils comprise another useful class of synthetic lubricants; they include tetraethyl silicate, tetraisopropyl silicate, tetra-(2-ethylhexyl)silicate, tetra-(4-methyl-2-ethylhexyl)silicate, tetra-(p-tertbutylphenyl)silicate, hexa-(4-methyl-2-pentoxy) disiloxane, poly(methyl)siloxanes and poly(methylphenyl) siloxanes. Other synthetic lubricating oils include liquid esters of phosphorus-containing acids (e.g., tricresyl phosphate, trioctyl phosphate, diethyl ester of decylphosphonic acid) and polymeric tetrahydrofurans.

Unrefined, refined and rerefined oils can be used in the lubricants of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. Refined oils are similar to the unrefined oils except they have been further treated in one or more purification steps to improve one or more properties. Many such purification techniques, such as distillation, solvent extraction, acid or base extraction, filtration and percolation are known to those skilled in the art. Rerefined oils are obtained by processes similar to those used to obtain refined oils applied to refined oils which have been already used in service. Such rerefined oils are also known as reclaimed or reprocessed oils and often are additionally processed by techniques for removal of spent additives and oil breakdown products.

Compositions when containing these conventional additives are typically blended into the base oil in amounts effective to provide their normal attendant function. Representative effective amounts of such additives (as the respective active ingredients) in the fully formulated oil are illustrated as follows:

| Compositions | Wt. % A.I. (Preferred) | Wt. % A.I. (Broad) |
| --- | --- | --- |
| Viscosity Modifier | .01–4 | 0.01–12 |
| Detergents | 0.01–3 | 0.01–20 |
| Corrosion Inhibitor | 0.01–1.5 | .01–5 |
| Oxidation Inhibitor | 0.01–1.5 | .01–5 |
| Dispersant | 0.1–8 | .1–20 |
| Pour Point Depressant | 0.01–1.5 | .01–5 |
| Anti-Foaming Agents | 0.001–0.15 | .001–3 |
| Anti-Wear Agents | 0.001–1.5 | .001–5 |
| Friction Modifiers | 0.01–1.5 | .01–5 |
| Mineral Oil Base | Balance | Balance |

When other additives are employed, it may be desirable, although not necessary, to prepare additive concentrates comprising concentrated solutions or dispersions of the novel dispersants of this invention (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the additives in proper amounts to provide the desired concentration in the final formulation when the additive-package is combined with a predetermined amount of base lubricant. Thus, the dispersants of the present invention can be added to small amounts of base oil or other compatible solvents along with other desirable additives to form additive-packages containing active ingredients in collective amounts of typically from about 2.5 to about 90%, and preferably from about 15 to about 75%, and most preferably from about 25 to about 60% by weight additives in the appropriate proportions with the remainder being base oil.

The final formulations may employ typically about 10 wt. % of the additive-package with the remainder being base oil.

All of said weight percents expressed herein (unless otherwise indicated) are based on active ingredient (A.I.) content of the additive, and/or upon the total weight of any additive-package, or formulation which will be the sum of the A.I. weight of each additive plus the weight of total oil or diluent.

This invention will be further understood by reference to the following examples, wherein all parts are parts by weight, unless otherwise noted and which include preferred embodiments of the invention.

Examples of the Preparation of Polyaniline Grafted Polymers

EXAMPLE 1

(a) A solution of 2.3 g (0.01 mol) ammonium peroxydisulfate [$(NH_4)_2S_2O_8$] in 150 ml 1M HCl was stirred at room temperature. 16 grams of polyisobutylene-$NH_2$ (PIB-$NH_2$) (PIB $\overline{M}_n$ 2200) (0.73 wt. % N) was dissolved in 50 ml THF and was mixed with 4.85 g (0.052 mol.) of aniline, employing a charge ratio of 6.2:1 moles of aniline per reactive amine molar equivalent. This amine solution was added to the acidic oxidizing solution and the polymerization product solution was stirred for 6 hours. The precipitate was then collected by filtering and was washed with about 200 ml of 1M HCl until the filtrate became colorless. The solid residue was dissolved in 400 ml of xylene, filtered and solvent was removed from the filtrate by distillation. The product obtained was dried in vacuum oven at room temperature for 24–48 hours. The dried polymer product was found to contain 1.0 wt. % N.

(b) To convert the grafted polyaniline hydrochloride obtained in (a) above into the polyaniline base form, the hydrochloride was suspended in aqueous $NH_4OH$ (approximately 100 ml of 0.1M aqueous solution of $NH_4OH$ were used per gram of the hydrochloride) with stirring for 16 hours at room temperature. The pH of the solution was periodically adjusted to ca. 10 (pH paper test) by the addition of a small amount of 1M $NH_4OH$. The suspension was then filtered and the precipitate was washed with ca. 400 ml of 0.1M $NH_4OH$ followed by five 50 ml portions of a 1:1 mixture of methanol and 0.2M $NH_4OH$. The polymer base so prepared was dried under dynamic vacuum at room temperature for 48 hours. The dried polymer product was found to contain 1.55 wt. % N.

EXAMPLE 2

Using the procedure of Example 1(a), a solution of 4.6 g (0.02 mol) ammonium peroxydisulfate [$(NH_4)_2S_2O_8$] in 200 ml 1M HCl was stirred at room temperature. 7.5 grams of PIB-$NH_2$ was dissolved in 100 ml THF and was mixed with 9.3 g (0.1 mol) of aniline, to provide an aniline:reactive amine equivalent molar charge ratio of about 25:1. This amine solution was added to the acidic oxidizing solution and was allowed to stir. The reaction was exothermic and temperature of the reaction went up to the 50° C. The solution was allowed to stir for 6 hours. After ca. 6 hrs., the precipitate was collected and was washed until the filtrate became colorless using about 200 ml of 1M HCl. The solid residue was dissolved in 400 ml of xylene, filtered and the solvent was removed from the filtrate by distillation. The graft polymer obtained was further stirred with 200 ml of 1M HCl to ensure complete doping. The product was filtered and dried in vacuum oven at room temperature for 24–48 hours. The dried product contained 4.53 wt. % N and its two probe conductivity was $3 \times 10^{-3}$ S/cm.

EXAMPLE 3

(a) Using the procedure of Example 1(a), a 100 grams of the PIBSA-PAM dispersant product prepared as in Example R was mixed with 4.6 g (0.02 mol) ammonium peroxydisulfate [$(NH_4)_2S_2O_8$] and 200 ml 1M HCl and was stirred at room temperature. 1 gram (0.0107 mol) of aniline was added slowly the above solution (to provide an aniline:reactive amine equivalent molar charge ratio of about 0.4:1) and was allowed to stir for 6 hours. After ca. 6 hrs., the precipitate was collected and was washed until the filtrate became colorless using about 200 ml of 1 M HCl. The product was dried in vacuum oven at room temperature for 24–48 hours.

(b) The convert grafted polyaniline hydrochloride into polyaniline base, the hydrochloride was suspended in aqueous NH$_4$OH (approximately 100 ml of 0.1M aqueous solution of NH$_4$OH were used per gram of the hydrochloride) with stirring for 16 hours at room temperature. The pH of the solution was periodically adjusted to ca. 10 (pH paper test) by the addition of a small amount of 1M NH$_4$OH. The suspension was then filtered and the precipitate was washed with ca. 400 ml of 0.1M NH$_4$OH followed by five 50 ml portions of a 1:1 mixture of methanol and 0.2M NH$_4$OH. The polymer base was dried under dynamic vacuum at room temperature for 48 hours.

Graft Characterization

Ultraviolet-Visible Spectroscopy is a useful technique to characterize conjugated polymers such as the polyaniline grafted polymers of this invention. FIG. 1 shows the solution electronic absorption spectra of polyaniline grafted PIB-NH$_2$ of Example 1 recorded in hexane solution, in the neutral state (product of Example 1(b)) and in the doped state (product of Example 1(a)). These spectra were spectra of true solutions as evidenced by the fact that there was no evidence of deposition or precipitation of solid, when solutions were kept undisturbed over a period of two weeks. Unlike the grafted polymers of this invention, the homopolymer of polyaniline is not soluble in hexane or other typical organic solvents. The spectra of polyaniline homopolymer which have been reported in the literature (Wudl, F.; Angus, R. O.; Lu, F. L.; Allemend, P. M.; Vachon, D. J.; Nowak, M.; Liu, Z. X.; Heeger, A. J., *J. Am. Chem. Soc.* 1987, 109, 3677) polyaniline and polyaniline. HCl, show characteristic peaks at the 620 nm and 820 nm, respectively. However, these spectra were obtained for colloidal suspensions which are not stable, and in the case of homopolymer of polyaniline, a deposition of green precipitate is seen even in DMF, leaving a completely colorless solution within 12 hours.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. An oil-soluble dispersant and antioxidant additive which comprises an N-containing polymer adduct comprising the reaction product of a polyalkylene polyamine with a polymer substituted with mono- or dicarboxylic acid, anhydride or ester groups, wherein said N-containing polymer adduct has been grafted in the presence of an effective amount of an oxidizing agent, by polymerizing thereon at least one aromatic N-monomer represented by the formula:

wherein Ar' is

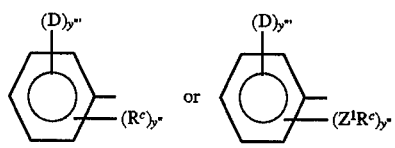

wherein $R^c$ in each instance in which it appears is independently $C_1$ to $C_{12}$ alkyl, y' is an integer of from 1 to 4, y'' is an integer of from 0 to 4, y''' is an integer of from 0 to 4, D in each instance in which it appears is independently Cl, Br or I, $R^b$ is hydrogen or $C_1$ to $C_{20}$ alkyl, and $Z^1$ is a branched or straight chain alkylene group which can contain one or more —O— or —S— chain atoms, with the proviso that the sum of y'+y''+y''' is from 1 to 5.

2. The oil-soluble additive according to claim 1 wherein said substituted polymer reactant comprises at least one long chain hydrocarbyl substituted mono- or dicarboxylic acid producing material formed by reacting (i) an olefin polymer derived from $C_2$ to $C_{10}$ monoolefin and having a number average molecular weight of about 300 to 10,000 and (ii) at least one of a $C_4$ to $C_{10}$ monounsaturated dicarboxylic acid material and a $C_3$ to $C_{10}$ monounsaturated monocarboxylic acid material, having an average of at least about 0.5 dicarboxylic acid producing moieties, per molecule of said olefin polymer present in the reaction mixture used to form said acid producing material.

3. The oil-soluble additive according to claim 2 wherein in said polyalkylene polyamine each said alkylene group contains from 2 to 6 carbons and said polyalkylene polyamine contains from 3 to about 8 nitrogen atoms per molecule.

4. The oil-soluble additive according to claim 3, wherein said hydrocarbyl substituted monounsaturated acid producing material comprises hydrocarbyl substituted $C_4$ to $C_{10}$ monounsaturated dicarboxylic acid producing material which comprises polyisobutylene of about 700 to 5000 number average molecular weight substituted with succinic anhydride moieties and wherein in said polyalkylene polyamine each said alkylene group contains from 2 to 6 carbons and said polyalkylene polyamine contains from 5 to 9 nitrogen atoms per molecule.

5. The oil-soluble additive according to claim 4, wherein said polyalkylene polyamine comprises polyethylene polyamine or polypropyleneamine.

6. The oil-soluble additive of claim 5, wherein said number average molecular weight of said polyisobutylene is from about 1,300 to 3,000.

7. The oil-soluble additive of claim 6, wherein said monounsaturated acid material comprises maleic anhydride.

8. The oil soluble additive of claim 1 wherein said polymer comprises ethylene-propylene copolymer.

9. The oil soluble additive of claim 8 wherein said copolymer number average molecular weight is from about 3,000 to 10,000.

10. The oil soluble additive of claim 1, wherein said aromatic monomer comprises at least one member selected from the group consisting of aniline, o-toluidine, m-toluidine, o-ethylaniline, and m-ethylaniline.

* * * * *